L. R. HEIM.
ROLLER BEARING.
APPLICATION FILED MAR. 6, 1915.
1,169,150.  Patented Jan. 25, 1916.
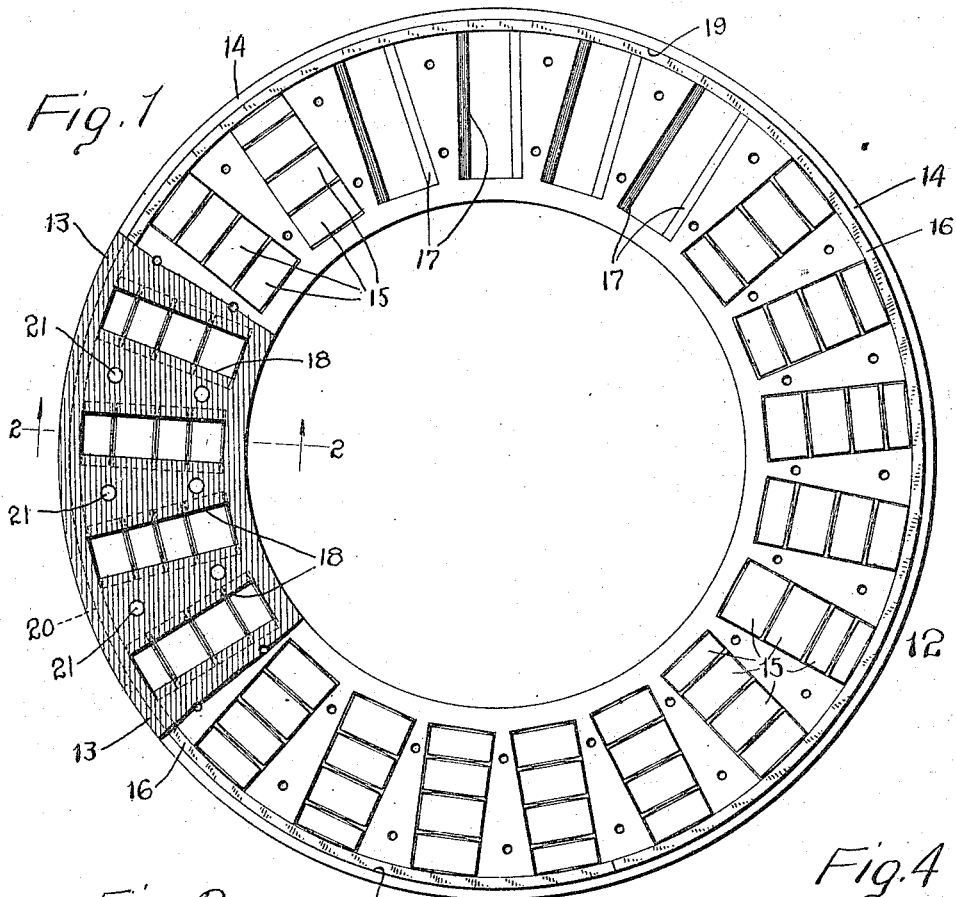
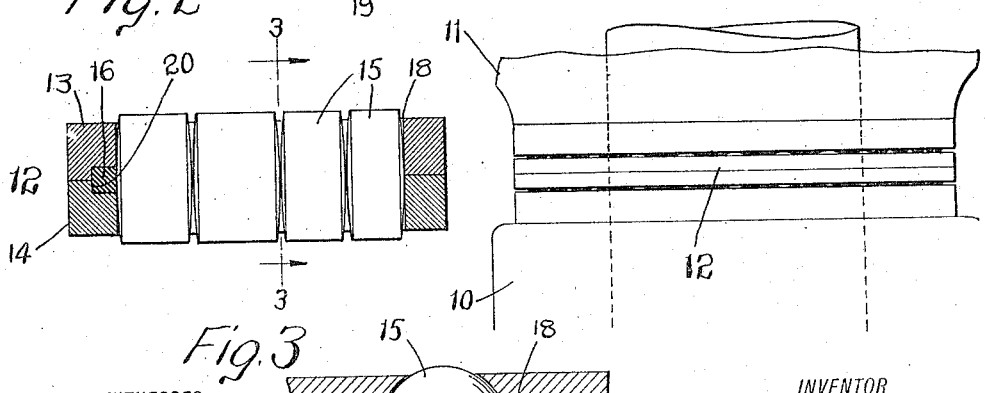
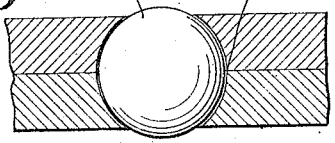
WITNESSES:
H. W. Meade
E. M. Culver
INVENTOR
Lewis R. Heim
BY
H. M. Brooster
ATTORNEY

UNITED STATES PATENT OFFICE.

LEWIS R. HEIM, OF DANBURY, CONNECTICUT, ASSIGNOR TO THE BALL AND ROLLER BEARING COMPANY, OF DANBURY, CONNECTICUT, A CORPORATION OF CONNECTICUT.

ROLLER-BEARING.

1,169,150. Specification of Letters Patent. Patented Jan. 25, 1916.

Application filed March 6, 1915. Serial No. 12,525.

*To all whom it may concern:*

Be it known that I, LEWIS R. HEIM, a citizen of the United States, residing at Danbury, county of Fairfield, State of Connecticut, have invented an Improvement in Roller-Bearings, of which the following is a specification.

This invention has for its object to provide a roller bearing which will give a maximum amount of wear while at the same time the cost of construction shall be reduced to the minimum.

With these and other objects in view I have devised the novel roller bearing which I will now describe, referring to the accompanying drawing forming a part of this specification and using reference characters to indicate the several parts.

Figure 1 is a plan view of my novel bearing, the top plate being partly broken away; Fig. 2 a section on an enlarged scale on the line 2—2 in Fig. 1, looking in the direction of the arrows; Fig. 3 a section on the line 3—3 in Fig. 2, looking in the direction of the arrows, and Fig. 4 is an elevation on a reduced scale illustrating a use of my novel bearing.

10 denotes a base, 11 a rotating part and 12 my novel bearing as a whole which is interposed between the base and the rotating part, a shaft being indicated by dotted lines. It is of course wholly immaterial whether the bearing is used in the vertical, horizontal or in any intermediate plane.

My novel bearing comprises essentially plates 13 and 14, rollers 15 socketed therein and a hardened thrust ring 16 which takes the end thrust of the rollers in each group. Each plate is provided with a plurality of equidistant, undercut radial slots, corresponding slots in the respective plates forming sockets 18 which receive and retain the rollers, portions of the peripheries of the rollers projecting on opposite sides of the plates when assembled, as clearly shown. The rollers are hardened and are preferably made slightly convex at their ends. Each socket contains a plurality of rollers which are made of a number of different lengths, as shown, so that the rollers in the different sockets will break joints and avoid the possibility of the formation of grooves in either of the members between which the bearing is used, as for example base 10 and rotating part 11.

The number of different lengths or sizes of rollers is immaterial, likewise the number of rollers in each socket, which may vary. In assembling, the sockets are filled with rollers, care being taken that rollers of the same length do not correspond in position in contiguous sockets. The sockets are filled loosely, that is without appreciable lost motion between the rollers.

Each plate is provided on its inner face with a circular groove 19, the corresponding grooves in the two plates forming a circular socket 20 which intersects the outer ends of the radial sockets and receives the thrust ring. This ring is hardened and takes the end thrust of the rollers in each group and also holds the plates concentric. After assembling, the plates are locked together by rivets or screws 21 which engage the plates between the radial slots.

Having thus described my invention I claim:—

1. A bearing of the character described comprising plates having undercut radial slots, corresponding slots in the respective plates forming sockets, rollers of different lengths in said sockets, said plates being provided on their inner faces with corresponding circular grooves which form a circular socket intersecting the outer ends of the radial sockets, and a thrust ring in the circular socket which takes the end thrust of the rollers.

2. A bearing of the character described comprising plates having radial sockets formed therein and extending through the plates and a circular socket intersecting the ends of the radial sockets, rollers in the radial sockets and a thrust ring in the circular socket which takes the end thrust of the rollers.

3. In a roller bearing the combination of plates having radial sockets and a circular socket intersecting the outer ends of the radial sockets, said sockets being half formed in each plate, rollers in the radial sockets and a thrust ring in the circular socket which receives the end thrust of the rollers and holds the plates concentric.

In testimony whereof I affix my signature in presence of two witnesses.

LEWIS R. HEIM.

Witnesses:
H. W. MEADE,
E. M. CULVER.

Copies of this patent may be obtained for five cents each, by addressing the "Commissioner of Patents, Washington, D. C."